United States Patent [19]
Hoff et al.

[11] Patent Number: 5,978,373
[45] Date of Patent: Nov. 2, 1999

[54] WIDE AREA NETWORK SYSTEM PROVIDING SECURE TRANSMISSION

[75] Inventors: James Hoff, Scottsdale; Randall L. Brown; Thomas J. Perry, both of Phoenix; Satrio P. Mualim, Glendale; Kevin B. Plyler, Scottsdale; John W. Spenik, Phoenix; James B. Southway, Glendale; Frank Sciabica, Phoenix; Scott J. Baer, Tempe, all of Ariz.

[73] Assignee: AG Communication Systems Corporation, Phoenix, Ariz.

[21] Appl. No.: 08/893,473

[22] Filed: Jul. 11, 1997

[51] Int. Cl.⁶ .............................. H04L 12/28; H04L 12/56
[52] U.S. Cl. .......................... 370/392; 370/400; 713/201
[58] Field of Search .................................. 370/351, 352, 370/401, 354, 355, 360, 422, 432, 434, 389; 395/186, 187.01; 713/201

[56] References Cited

U.S. PATENT DOCUMENTS

| | | | |
|---|---|---|---|
| 5,406,643 | 4/1995 | Burke et al. | 395/200 |
| 5,537,099 | 7/1996 | Liang | 340/825.07 |
| 5,684,800 | 11/1997 | Dobbins et al. | 370/401 |
| 5,786,770 | 6/1998 | Thompson | 340/825.06 |

*Primary Examiner*—Hassan Kizou
*Assistant Examiner*—Duc Ho
*Attorney, Agent, or Firm*—David J. Zwick

[57] ABSTRACT

A system that provides secure transmission of data between a subscriber's PC and an online service provider (OLS) over an Ethernet WAN. The system includes a remote transceiver unit located at a subscriber site and connected to the subscriber's PC; a central transceiver unit located at a telephone central office and connected to the remote transceiver unit over a twisted pair network and also connected to a WAN; an authorization server that is connected to the WAN; and one or more OLSs, which may include Internet service providers, connected to the WAN. Security of transmission is provided through a method in which only subscriber transmissions directed to a session-specific OLS are allowed to pass through the central transceiver unit onto the WAN, and only unicast transmissions from authorized OLSs are allowed to pass through the central transceiver unit to the subscriber port of the remote transceiver unit. Broadcast transmissions are minimized in favor of unicast messages. The authorization server delivers the IP and MAC addresses of the session-specific OLSs and the subscriber's PC to the remote transceiver units.

14 Claims, 12 Drawing Sheets

WIDE AREA NETWORK SYSTEM PROVIDING SECURE TRANSMISSION

FIELD OF THE INVENTION

The present invention relates to wide area network systems, and more particularly to an Ethernet-based wide area network system that provides secure transmission of data between a subscriber and a service provider.

BACKGROUND OF THE INVENTION

The Local Area Network (LAN) was developed in response to the needs of computer users to communicate among themselves and to share computing resources such as printers, file servers and electronic mail systems. The Institute of Electrical and Electronic Engineers (IEEE) defines a LAN as a network system that "allows a number of independent devices to communicate directly with each other, within a moderately sized geographic area over a physical communications channel of moderate data rates." Typically, LANs are implemented within buildings or among buildings in a campus environment. Devices on a LAN are usually directly connected to a dedicated cable or other medium.

With numerous devices connected to a dedicated medium, some means of controlling access to the medium is required so that any two devices wishing to exchange data can do so when required. One of the most common media access control protocols is carrier-sense multiple access with collision avoidance (CSMA/CD) developed for and typically used on a bus/tree LAN topology. CSMA/CD is fully described in the IEEE 802.3 standard. The most common implementation of LANs using CSMA/CD is Ethernet, developed by Xerox Corporation.

In CSMA/CD, a device first listens to the channel, referred to as carrier-sensing, to determine if another device is transmitting data. If the channel is busy, the device will wait a certain amount of time and check the channel again. If the channel is free, the device will begin transmitting. If two devices desiring access to the channel both begin transmitting at the same time, a collision will occur. Upon sensing a collision, the transmitting devices will apply a signal to the channel indicating that a collision has occurred, and that all devices should ignore the current data frame. The transmitting devices will then each wait a certain amount of time and attempt to re-transmit.

Concurrent with the development of the LAN is the development of the wide area network (WAN). As its name implies, the primary distinguishing characteristic of a WAN over a LAN is its scope of geographic coverage. WANs are typically used to interconnect LANs that are sufficiently distant from one another to be beyond the physical transmission limitations of a LAN. This is analogous to our telephone network wherein local telephone systems are interconnected by long distance carriers. And, in fact, it is typical for WANs to utilize the public telephone network (PTN) facilities.

An increasingly popular application of LAN/WAN technology is internet and intranet access from work and home. This application is typically implemented over the PTN using point-to-point connections or over the public switched telephone network (PSTN) using dial-up or ISDN (Integrated Services Digital Network) modems to access an online service (OLS), which typically would be a company's restricted access intranet, or a Network Service Provider (NSP) who then provides access to the Internet. A problem with this typical implementation is the relatively low data transmission speed of these modems as compared to the transmission speed to the desktop that a user of a company LAN may see. High-speed dial-up modems currently operate in the 56 Kbps range, and ISDN currently operates in the 128 Kbps range, whereas a company LAN covering a campus environment could operate in the 10 Mbps-to-the-desktop range.

Another problem with this typical implementation is the use of limited central office switching resources. The longer average connect time for an "internet call" versus a regular telephone call will result in an increased requirement for central office switching resources as access to OLSs over the PSTN continues to grow.

A solution that overcomes the aforementioned problems that is gaining in popularity is to implement data networks using the existing PTN wireline network and twisted pair, and to bypass the central office switching equipment and use equipment specifically designed for data networking to transport data on these data networks. This data networking equipment, which is well known in the art, includes routers, concentrators and data switches. In essence, this solution extends the LAN/WAN to the home or business.

However, a problem with this solution is security of the transmissions from a subscriber's PC to the OLS. The typical Ethernet protocol is implemented as a broadcast protocol where all or a portion of all stations on a network monitor the transmission, and the targeted stations further process the transmission. Depending on the network topology, this may allow an enterprising individual to tap into the network and eavesdrop on the network traffic, obtaining, for example, various subscriber passwords. One current approach to ensuring the security of network transmissions is the use of data encryption. However, this approach can consume significant computing resources in carrying out the data encryption and decryption routines on the host and target systems. Another current approach is to implement the network in a full star topology of single-station nodes, with the central network controller device being a bridge, router or a hub with filtering or switching capabilities. However, these devices are designed more for interconnecting LANs and usually prove to be an expensive solution to address security issues in a star network.

Accordingly, it is an object of the present invention to provide a system and method that provides secure transmission of data between a subscriber and an OLS over a WAN.

Another object of the present invention is to provide a system and method that provides secure transmission of data between a subscriber and an OLS over a WAN that supports a known local area network protocol stack from media access control layer up to and including the transport layer.

SUMMARY OF THE INVENTION

The present invention describes a system and method that provides secure transmission of data between a subscriber's PC and an OLS over an Ethernet WAN incorporating a portion of the PTN or PSTN wireline network and twisted pair in a star or tree topology. The system includes one or more remote transceiver units, each including a modem and processor, located at subscriber sites and connected to the subscribers' PCs; one or more central transceiver units, each also including a modem and processor, located at an Ethernet network headend in a telephone central office, each central transceiver unit connected to one or more remote transceiver units over twisted pair; an authorization server that is connected to the Ethernet network; and a plurality of OLSs connected to the Ethernet network.

A typical implementation of the present invention may include several central transceivers installed in an Ethernet hub, each central transceiver having several remote transceivers attached. For illustration of the inventive concepts, the exemplary embodiment has one central transceiver unit with one remote transceiver attached to the central transceiver unit, the remote transceiver unit having several computing devices attached.

Security of transmission is provided through a method in which only subscriber transmissions directed to a session-specific OLS are allowed to pass through the central transceiver unit onto the WAN, and only transmissions from authorized OLS sources are allowed to pass through the central transceiver unit to the subscriber port of the remote transceiver unit. Broadcast transmissions are minimized in favor of directed messages. The authorization server manages and forwards the Internet Protocol (IP) and media access control (MAC) addresses of the session-specific OLS and the subscribers PC to the remote transceiver units.

DESCRIPTION OF THE PREFERRED EMBODIMENT

A WAN system of the present invention providing secure transmission of subscriber data preferably is an Ethernet-based network that utilizes the twisted pair wiring (TWP) of the PSTN as the physical medium to transmit the required electrical signals. In this embodiment, data and voice share the same physical medium and are separated as required using high-pass and low-pass filters. Data is transmitted preferably using asymmetrical digital subscriber line (ADSL) as the connection technology. Preferably, Address Resolution Protocol and Dynamic Host Configuration Protocol messaging is also used.

Figure 1:
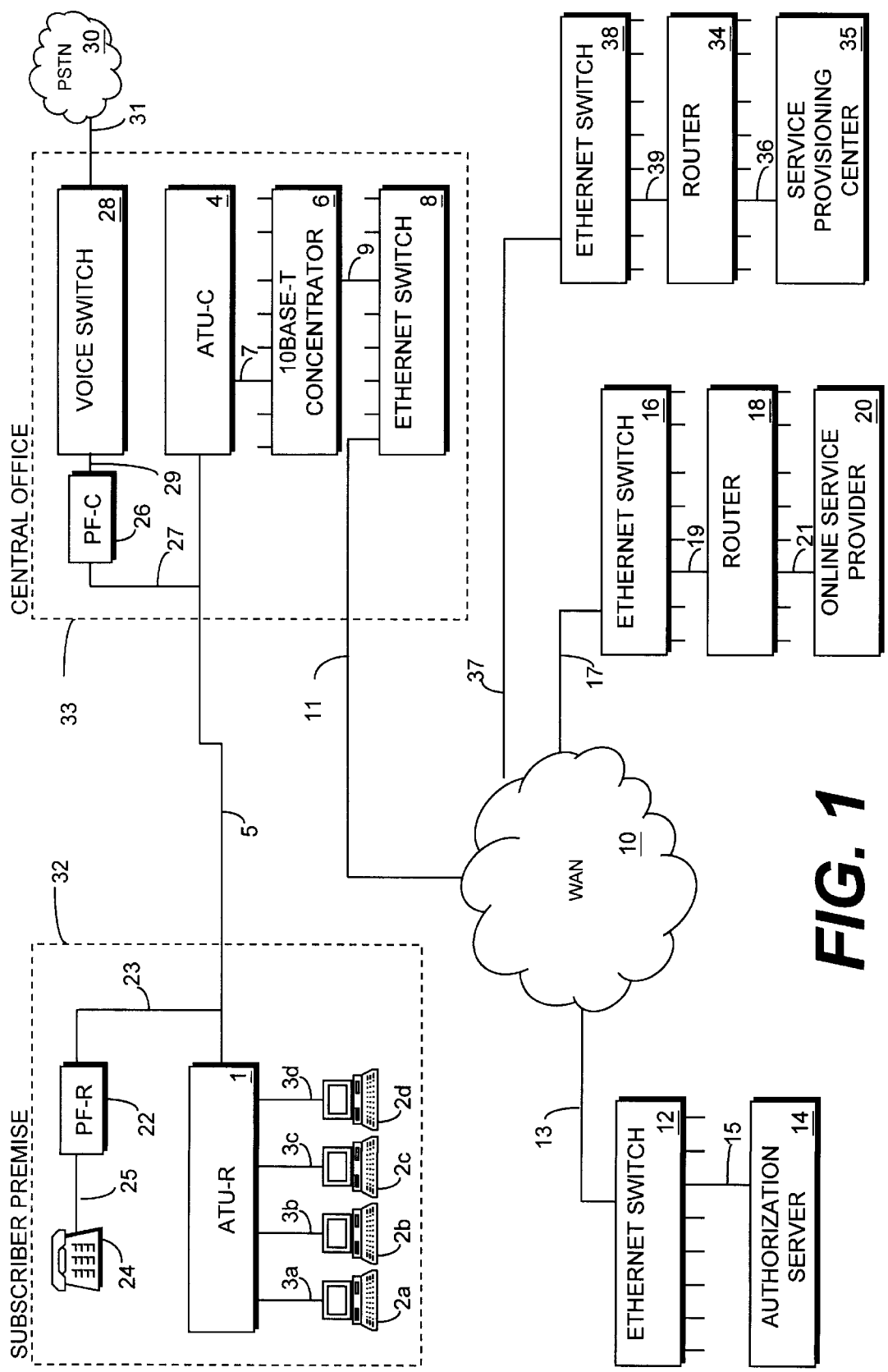
FIG. 1 shows a block diagram of the preferred embodiment of a WAN system of the present invention.

FIG. 1 shows a block diagram of the present invention. Remote ADSL transceiver unit ATU-R 1 is connected to computing devices 2 over connections 3. ATU-R 1 is further connected to central ADSL transceiver unit ATU-C 4 over TWP connection 5. ATU-C 4 is further connected to 10BASE-T concentrator 6 over connection 7. Concentrator 6 is further connected to Ethernet switch 8 over connection 9. Ethernet switch 8 is further connected to WAN network 10 over connection 11.

A second Ethernet switch 12 is connected to WAN 10 over connection 13. A Unix-based authorization server 14 is connected to Ethernet switch 12 over connection 15. A third Ethernet switch 16 is connected to WAN 10 over connection 17. Ethernet switch 16 is further connected to router 18 over connection 19. OLS 20 is connected to router 18 over connection 21. A fourth Ethernet switch 38 is connected to WAN 10 over connection 37. Ethernet switch 38 is further connected to router 34 over connection 39. Service provisioning center 35 is connected to router 34 over connection 36.

Also connected to TWP connection 5 are remote POTS ("plain old telephone service") filter 22 over TWP connection 23, and central POTS filter 26 over connection 27. POTS filters 22 and 26 are low-pass filters that separate the voice portion of the information on TWP connection 5 for processing by the telephone service-related components of the network. Remote POTS filter 22 is further connected to telephone 24 over TWP connection 25. Voice switch 28 is connected to POTS filter 26 over connection 29. Voice switch 28 is further connected to other elements of PSTN 30 over connection 31.

ATU-R 1, computing devices 2, remote POTS filter 22 and telephone 24 are preferably located on a subscriber's premises 32. ATU-C 4, concentrator 6, Ethernet switch 8, central POTS filter 26 and voice switch 28 are preferably located in a telephone central office 33.

In operation, the telephone service provider lays the groundwork for the secure transmission service offering by installing authorization server 14 on WAN 10, and prior to subscriber connection, installing ATU-C 4 in telephone central office 33. Upon initial power-up, ATU-C 4 communicates with authorization server 14 and establishes all necessary addressing information. In particular, service provisioning center 35 is established as the only authorized OLS with which ATU-C 4 can exchange messages.

The subscriber then calls the telephone service provider and registers for the secure transmission service of the present invention. Personal identification information, such as name, phone number and social security number, and the choice of a default OLS is supplied to the telephone service provider. The subscriber is given an account number by the telephone service provider for the secure transmission service. The information provided by the subscriber is entered into a database on authorization server 14 and associated with the account number.

At the time of registration, arrangements are made with the telephone service provider for the installation of remote POTS filter 22 and delivery of ATU-R 1. The telephone service provider also assigns a port on ATU-C 4 that is associated with the subscriber's TWP phone circuit 5.

POTS filter 22 is then installed at the demarcation block of customer premises 32 and the low-pass output of POTS filter 22 is connected to one pair of the inside telephone wiring, while the unfiltered signal is connected to another pair. The subscriber then connects ATU-R 1 to the unfiltered signal pair and to a power supply.

Upon power-up of ATU-R 1, it, ATU-C 4 and authorization server 14 communicate, resulting in the establishment of necessary addressing information and operating software being downloaded from authorization server 14 onto ATU-R 1.

The subscriber then connects computing devices 2 to ATU-R 1. As each of computing devices 2 is powered-up, it communicates with ATU-C 4 and authorization server 14 and necessary addressing information is established. In addition, a WAN session is established between the computing device 2 and authorization server 14, and authorization server 14 delivers a service registration template hypertext markup language (HTML) file to computing device 2.

A web browser is launched on computing device 2 that displays the registration template. The subscriber fills in the template blanks with the requested personal information plus the account number assigned to the subscriber. The personal information will be the same information requested by the telephone service provider when the subscriber initially registered for the secure transmission service via a telephone call. Upon completion of the registration template, the information is sent to authorization server 14 where it is compared to information residing in the database on authorization server 14.

If the template information matches an entry in the authorization server 14 database, ATU-C 4 is updated by authorization server 14 to reflect the subscriber's preferred OLS. The subscriber will not be required to complete the registration template on subsequent OLS accesses from the same computing device-ATU-R combination. This OLS now becomes the only authorized source and destination for OLS messages on the WAN.

The connection with service provisioning center 35 is severed, and the subscriber now establishes a connection with the preferred OLS. At this point, the subscriber is fully registered and active with the preferred OLS.

FIGS. 2 through 6 show message flow diagrams of the processes involved in establishing the secure transmission of the present invention.

Figure 2:
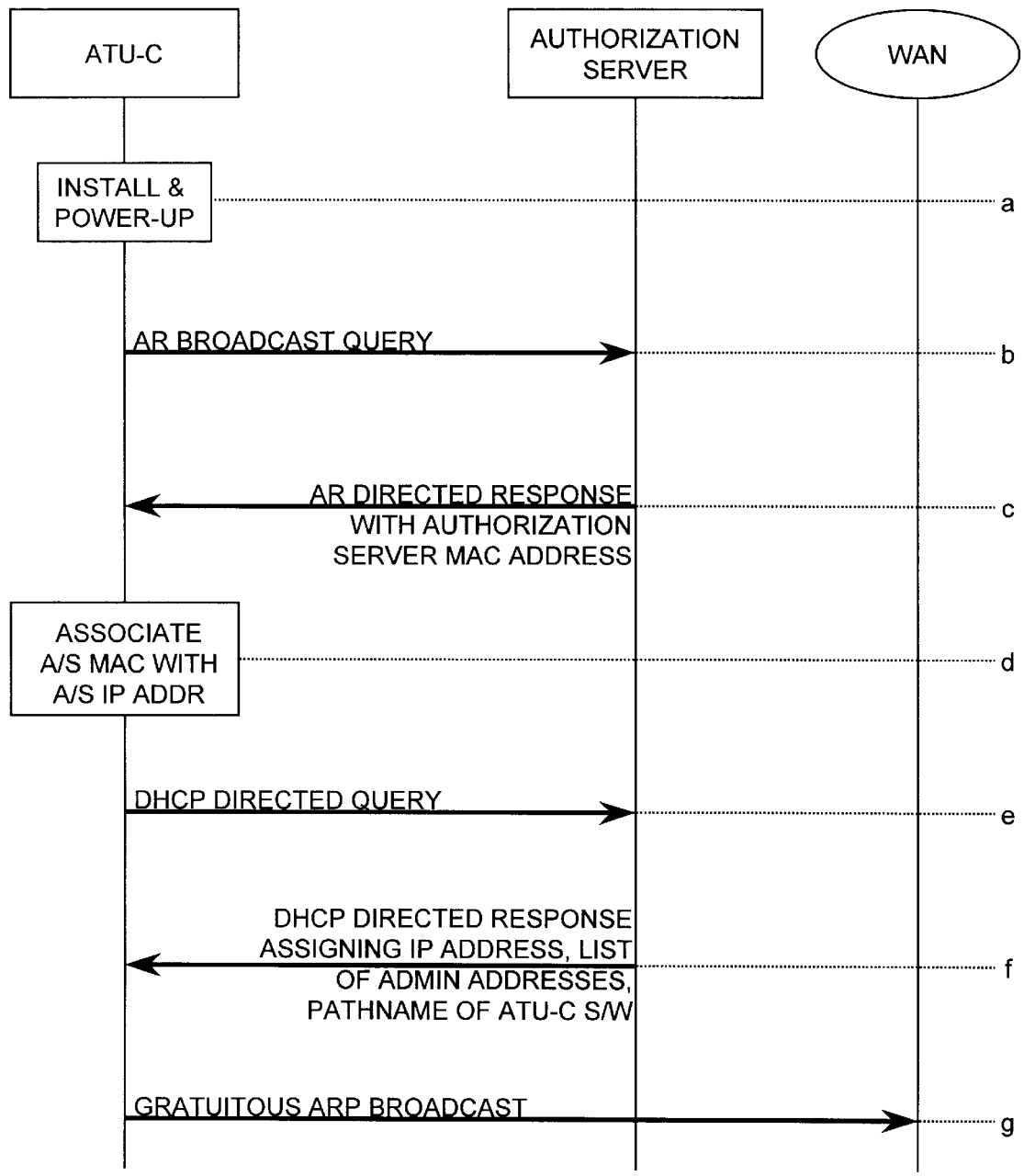
FIG. 2 shows a message flow diagram of the ATU-C establishment process of the present invention.

FIG. 2 is a message flow diagram showing the process of ATU-C establishment upon power-up. This process occurs the first time an ATU-C is installed and powered up.

At a, ATU-C 4 is installed into central office 33 and powered-up prior to connecting ATU-R 1.

At b, as part of the power-up sequence, ATU-C 4 broadcasts an address resolution request message to learn the MAC address of authorization server 14. This address resolution message can follow the Address Resolution Protocol (ARP) format or may be a proprietary format. The IP destination address of authorization server 14 is a predetermined address that is programmed into ATU-C 4. ATU-C 4 uses a temporary IP source address of zero. Alternatively, ATU-C 4 could fill in an IP address that authorization server 14 is programmed to recognize.

At c, authorization server 14 responds to the address resolution request from ATU-C 4 with a directed, or unicast, address resolution reply message containing the MAC address of authorization server 14. Using a directed address resolution response ensures that no other device will receive the authorization server 14 MAC address.

At d, ATU-C 4 associates the authorization server 14 IP address with the authorization server 14 MAC address.

At e, ATU-C 4 sends a directed Dynamic Host Configuration Protocol (DHCP) query to authorization server 14 using the authorization server's MAC address obtained from the address resolution reply at d. Using a directed DHCP query ensures that this message is received by no other device except authorization server 14. Using directed DHCP queries also has the indirect effect of reducing traffic in the network and reduces utilization in devices with multiple ports.

At f, authorization server 14 responds to ATU-C 4 with a directed DHCP response and assigns ATU-C 4 an IP address. Through a file transfer protocol, authorization server 14 also sends ATU-C 4 a list of administrative addresses, such as the IP address of telephone service provider provisioning service center 35, and the full pathname of a download file that contains the operational software for the ATU-C 4. This list of addresses and the boot file address may be customized for the particular ATU-C making the request At g, ATU-C 4 broadcasts a gratuitous ARP message to check that no other devices on the WAN have the same IP address just assigned, and allows systems attached to the WAN to update their ARP tables if needed.

Authorization server 14 stores a copy of everything that is stored in ATU-C 4. If ATU-C 4 is physically reset, the information previously stored in ATU-C 4 is restored by authorization server 14 when communication to ATU-C 4 resumes.

Figure 3:
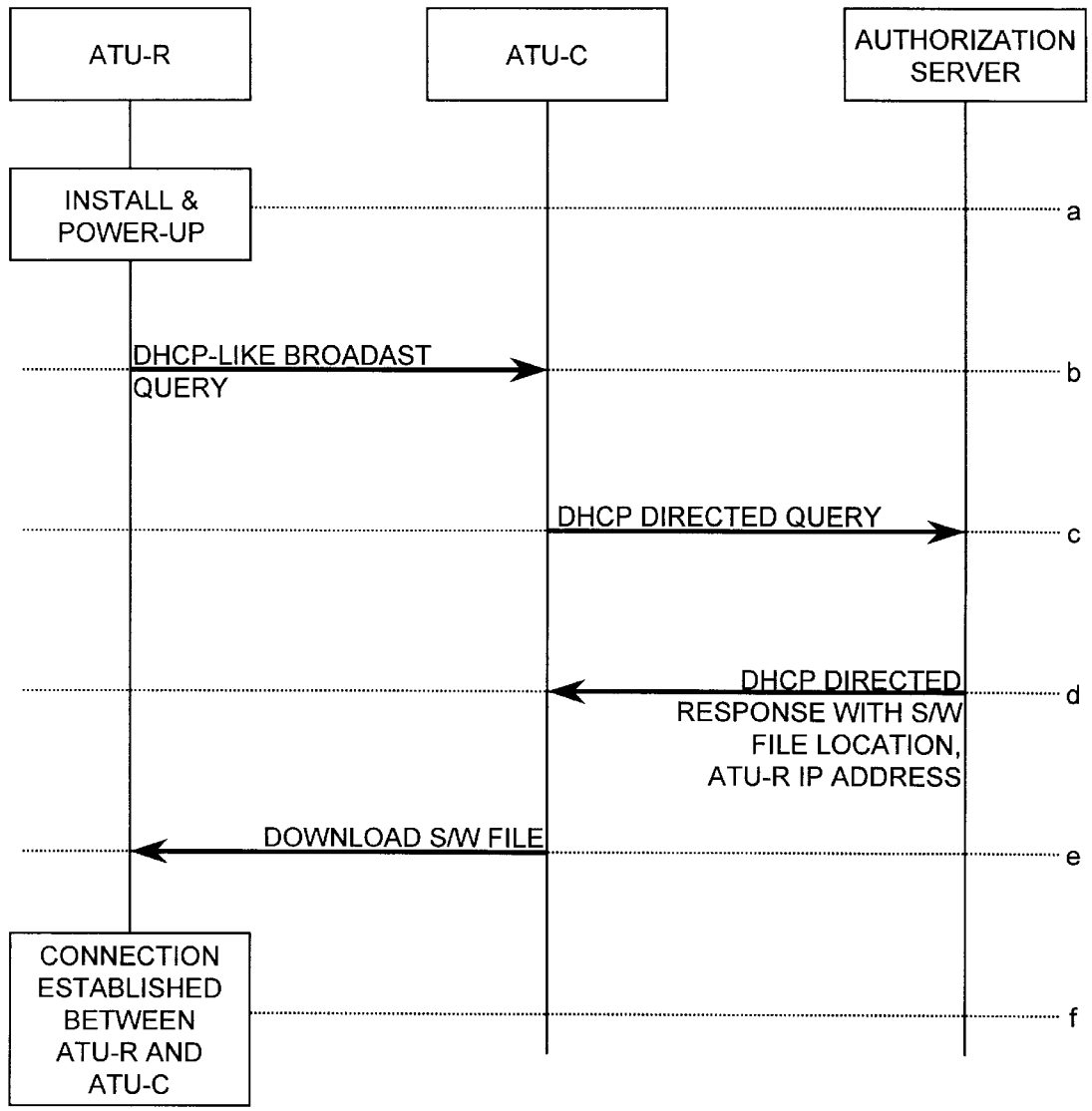
FIG. 3 shows a message flow diagram of the ATU-R establishment process of the present invention.

FIG. 3 is a message flow diagram showing the process of ATU-R establishment upon power-up. This process occurs the first time an ATU-R is installed and connected to a particular ATU-C.

At a, ATU-R 1 is installed and powered-up at a remote location, typically a subscriber's home or small business, prior to connecting computing devices 2.

At b, as part of the power-up routine, ATU-R 1 broadcasts a DHCP-like query.

At c, ATU-C 4 receives the broadcast DHCP-like query and sends a directed DHCP query on behalf of ATU-R 1 to authorization server 14 to learn the location of the ATU-R 1 operating software file location. Sending a directed DHCP query ensures that no other device will receive the message.

At d, authorization server 14 receives the directed DHCP query and responds with a directed DHCP response to ATU-C 4 that includes the ATU-R 1 software file location and an IP address for ATU-R 1.

At e, ATU-C 4 file transfers the ATU-R 1 software file to ATU-R 1. ATU-C 4 also assigns an ATU-C 4 port for ATU-R 1 to address messages to.

At f, a connection is established between ATU-R 1 and ATU-C 4, with ATU-C 4 now defined as a proxy for ATU-R 1.

Figure 4A:
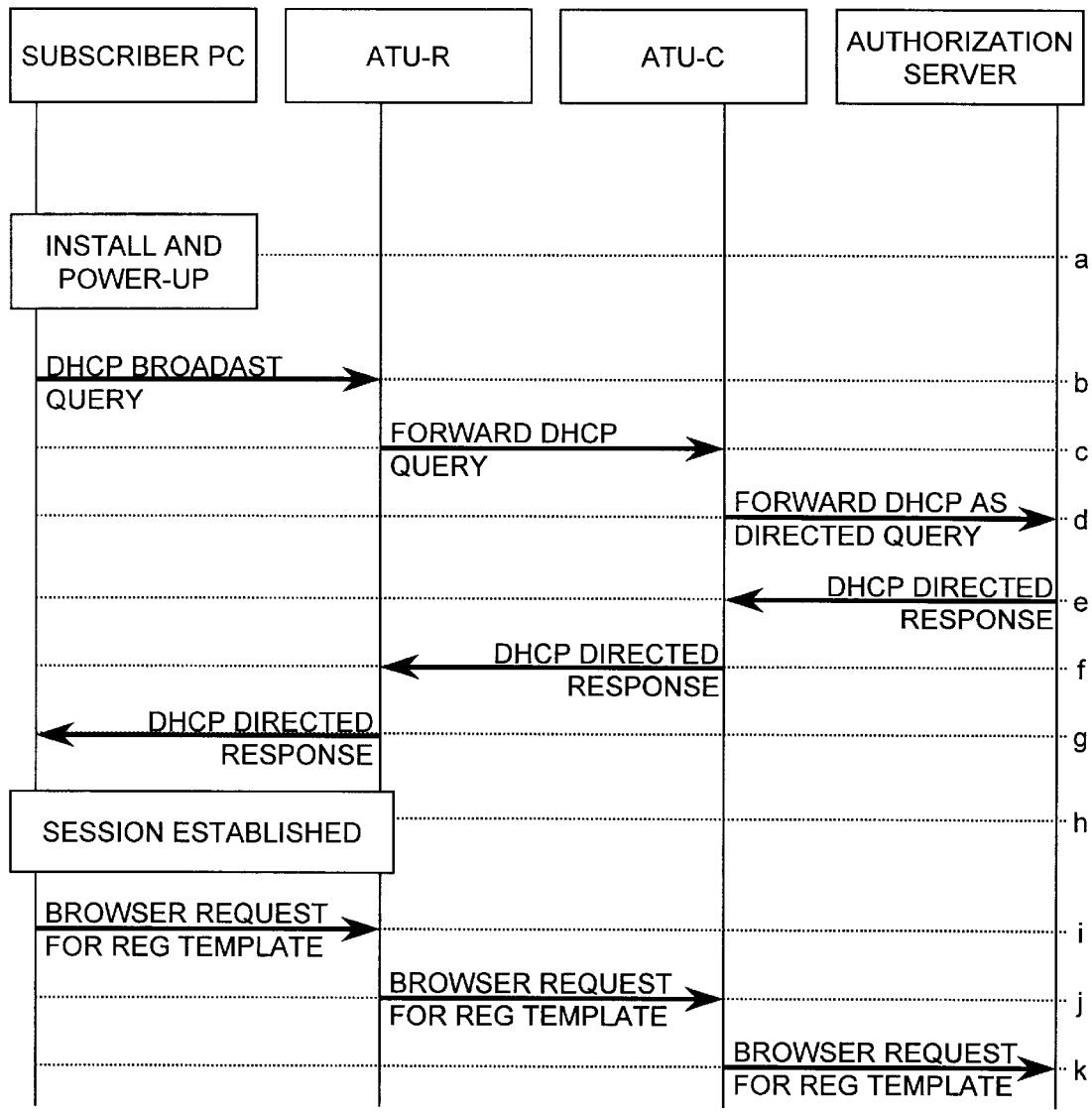
FIG. 4 shows a message flow diagram of the secure transmission registration process of the present invention.
Figure 4B:
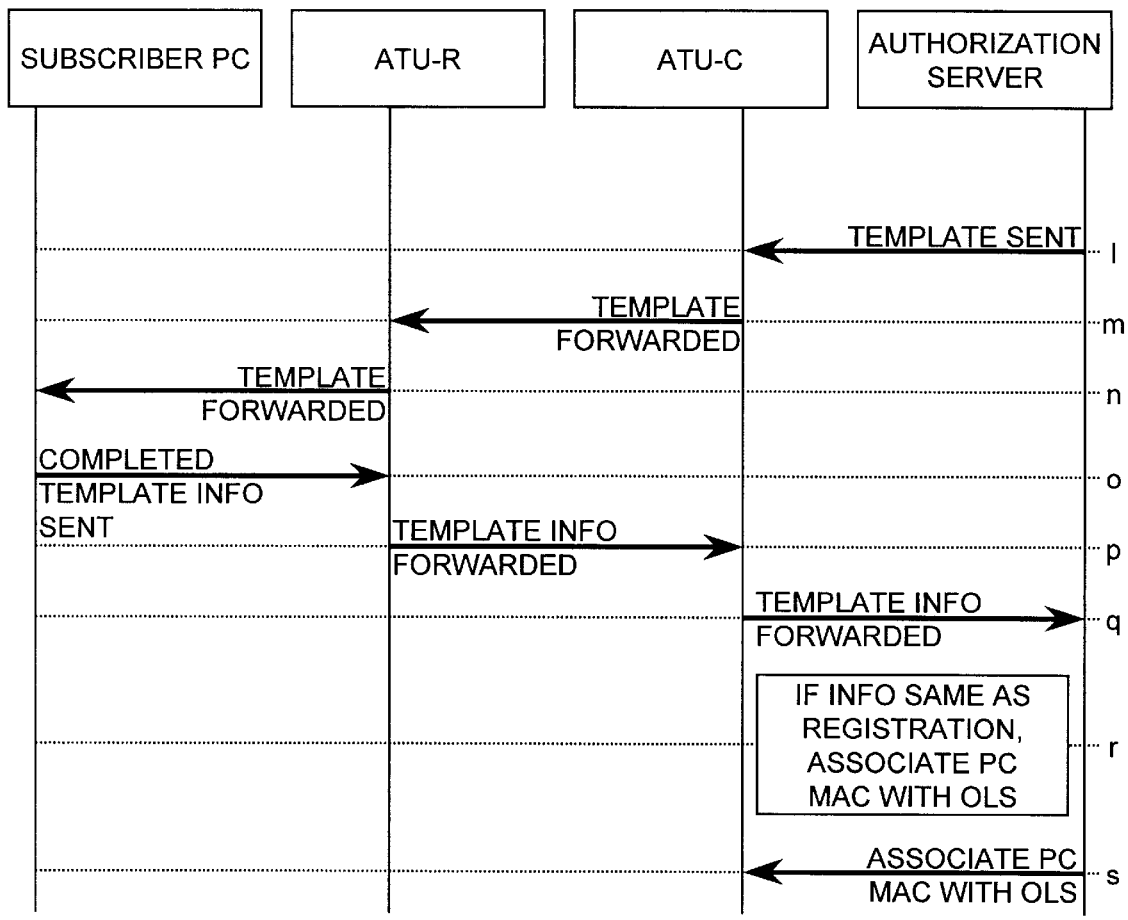

FIG. 4 is a message flow diagram showing the process of subscriber service registration. This process occurs the first time a subscriber accesses the secure transmission service offering.

At a, a computing device 2 is installed and powered-up. ATU-R 1 learns the MAC addresses of computing devices 2 connected to it that are powered up and sends these MAC addresses to ATU-C 4, which records the information. The limited bridging capability of ATU-R 1 keeps communications between computing devices 2 at a local level and does not pass these messages to ATU-C 4. Messages from computing devices 2 with destination addresses other than computing devices 2 are passed by ATU-R 1 to ATU-C 4 for transport over WAN 10.

At b, when a computing device 2 recognizes a connection to ATU-R 1, the Ethernet adapter card in computing device 2 broadcasts a DHCP request to obtain an IP address.

At c, ATU-R 1 receives the DHCP broadcast and passes it on to ATU-C 4.

At d, ATU-C 4 receives the DHCP request. ATU-C 4 does not recognize the MAC address of computing device 2 in the DHCP as having established a connection to an OLS from ATU-R 1, and forwards the DHCP request as a directed query to authorization server 14.

At e, authorization server 14 receives the DHCP request and responds to ATU-C 4 by sending a directed DHCP response with a temporary IP address for computing device 2. Authorization server 14 associates this temporary IP address with the computing device 2 MAC address and stores this information. At this point authorization server 14 is the subscriber's only authorized source and destination of messages on WAN 10.

At f, ATU-C 4 forwards the DHCP response with the temporary IP address to ATU-R 1.

At g, ATU-R 1 forwards the DHCP response to the target computing device 2.

At h, a connection is established with authorization server 14.

At i, the subscriber, through computing device 2, sends ATU-R 1 a web browser request for the registration template. The template is a "fill-in-the-blanks" online registration template. The template includes fields for the same information requested from the subscriber at the time of secure transmission service registration.

At j, the browser request is forwarded by ATU-R 1 to ATU-C 4.

At k, the browser request is forwarded by ATU-C 4 to authorization server 14.

At l, authorization server 14 sends the registration template to ATU-C 4.

At m, the registration template is forwarded by ATU-C 4 to ATU-R 1.

At n, the registration template is forwarded by ATU-R 1 to computing device 2.

At o, the subscriber fills in the template fields with the requested information, and the information is sent to ATU-R 1.

At p, the template information is forwarded by ATU-R 1 to ATU-C 4.

At q, the template information and a DHCP directed message with the port identification to which computing device 2 is connected is sent by ATU-C 4 to authorization server 14.

At r, authorization server 14 receives the DHCP directed message and the template information. Authorization server 14 then releases the temporary IP address assigned to computing device 2 and the connection to computing device 2 is dropped. Authorization server 14 then compares the subscriber information supplied in the on-line registration template with information stored in the authorization server 14 database, which was supplied by the subscriber when the original registration-by-phone for the secure transmission service occurred. If the template information matches that stored in the database, Authorization server 14 associates the subscriber's computing device 2 MAC address with an individual port at ATU-C 4 and with the database information for that user. The Authorization server 14 also associates the subscriber's computing device 2 MAC address with the subscriber's preferred service provider.

At s, the association of the subscriber's computing device 2 to the subscriber's preferred OLS is copied to ATU-C 4. The subscriber is now an authorized secure transmission service user. The next time the subscriber powers up his computing device 2, ATU-C 4 still associates this MAC address with the preferred OLS, and the registration process is not repeated.

Figure 5:
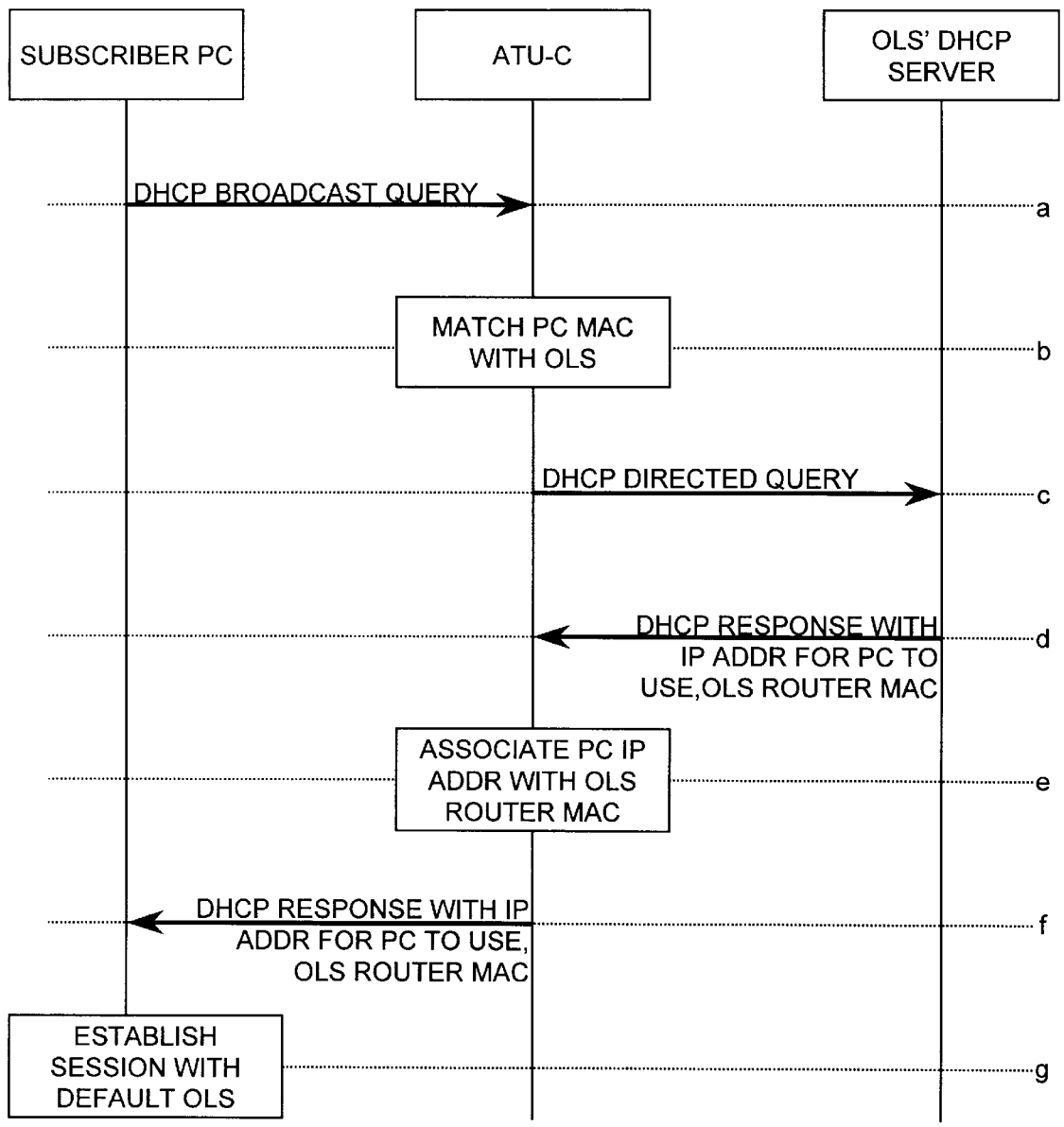
FIG. 5 shows a message flow diagram of the secure transmission service establishment process of the present invention.

FIG. 5 is a message flow diagram showing the process of service establishment to the subscriber's default online service provider. This process occurs when the subscriber accesses the secure transmission service and connects to his default, or previously connected to, OLS.

At a, computing device 2 sends out a DHCP broadcast query requesting an IP address. This DHCP can be invoked through several means, including computing device power-up or network application launch.

At b, ATU-C 4 receives the DHCP query and matches the computing device 2 MAC address with its default OLS.

At c, ATU-C 4 sends an DHCP directed query to the default OLS server to get an IP address for computing device 2.

At d, the OLS server assigns an IP address for computing device 2 to use and sends a DHCP response with the IP address and the MAC address of the service provider's router to ATU-C 4.

At e, ATU-C 4 associates the computing device 2 newly assigned IP address with the MAC address of the service provider's router and stores this information. A copy of this information is sent to authorization server 14. ATU-C 4 now has the MAC and IP addresses of both computing device 2 and the OLS router.

At f, ATU-C 4 forwards the DHCP response to computing device 2.

At g, a connection is established between computing device 2 and the default service provider, and the subscriber establishes a session with the OLS. Once the session between computing device 2 and the default OLS is established, ATU-C 4 only allows passage of network messages, with the exception of the aforementioned ARP and DHCP messages, having the MAC addresses of computing device 2 and the OLS router. All other incoming or outgoing messages are blocked.

Figure 6A:
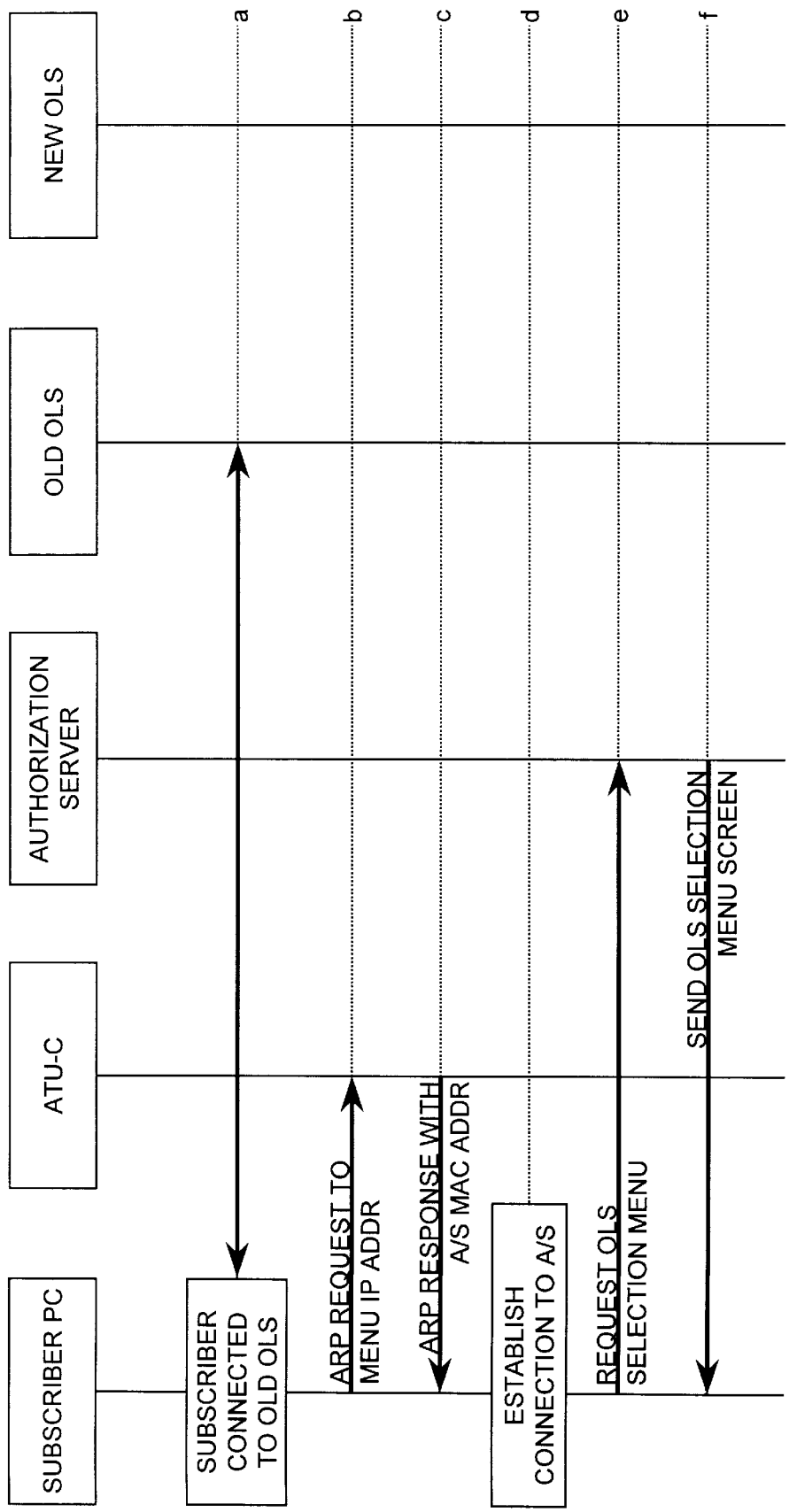
FIG. 6a shows the first part of a message flow diagram of the secure transmission service OLS selection process of the present invention.
Figure 6B:
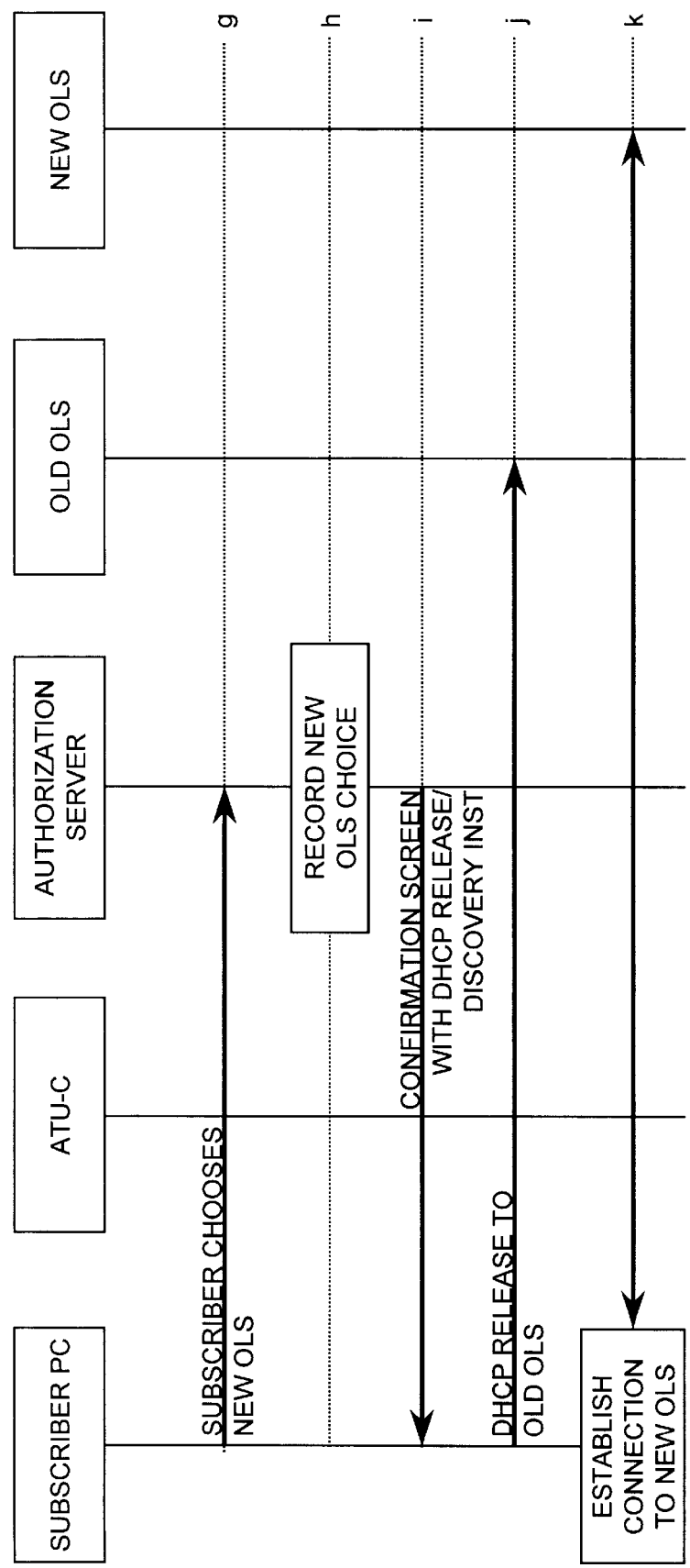
FIG. 6b shows the second part of a message flow diagram of the secure transmission service OLS selection process of the present invention.

FIGS. 6a and 6b are a message flow diagram showing the process of subscriber service selection where a subscriber chooses a different OLS from the one the subscriber is currently accessing.

At a, the subscriber currently has a connection established between a computing device 2 and an OLS.

At b, the subscriber requests a connection to the predetermined IP address of authorization server 14. This generates an address resolution broadcast message from computing device 2 to retrieve the MAC address of authorization server 14.

At c, ATU-C 4 receives the ARP request and sends an ARP response message to computing device 2 with the authorization server 14 MAC address.

At d, computing device 2 establishes a connection to authorization server 14.

At e, the web browser program on computing device 2 requests from authorization server 14 the OLS menu selection screen.

At f, authorization server 14 sends an OLS selection menu screen to computing device 2. This screen may be customized by authorization server 14 based on the MAC address of computing device 2.

At g, the subscriber makes a new OLS selection that is sent to authorization server 14.

At h, authorization server 14 records the newly selected OLS as the subscriber's new default OLS.

At i, authorization server 14 sends a confirmation screen to computing device 2 displaying the subscriber's new OLS choice, and instructions for the subscriber to perform a DHCP release to the currently connected OLS followed by a DHCP discovery.

At j, the subscriber sends a DHCP release to the old OLS.

At k, a new connection is established with the subscriber's new OLS choice, as shown in FIG. 5.

Figure 7:
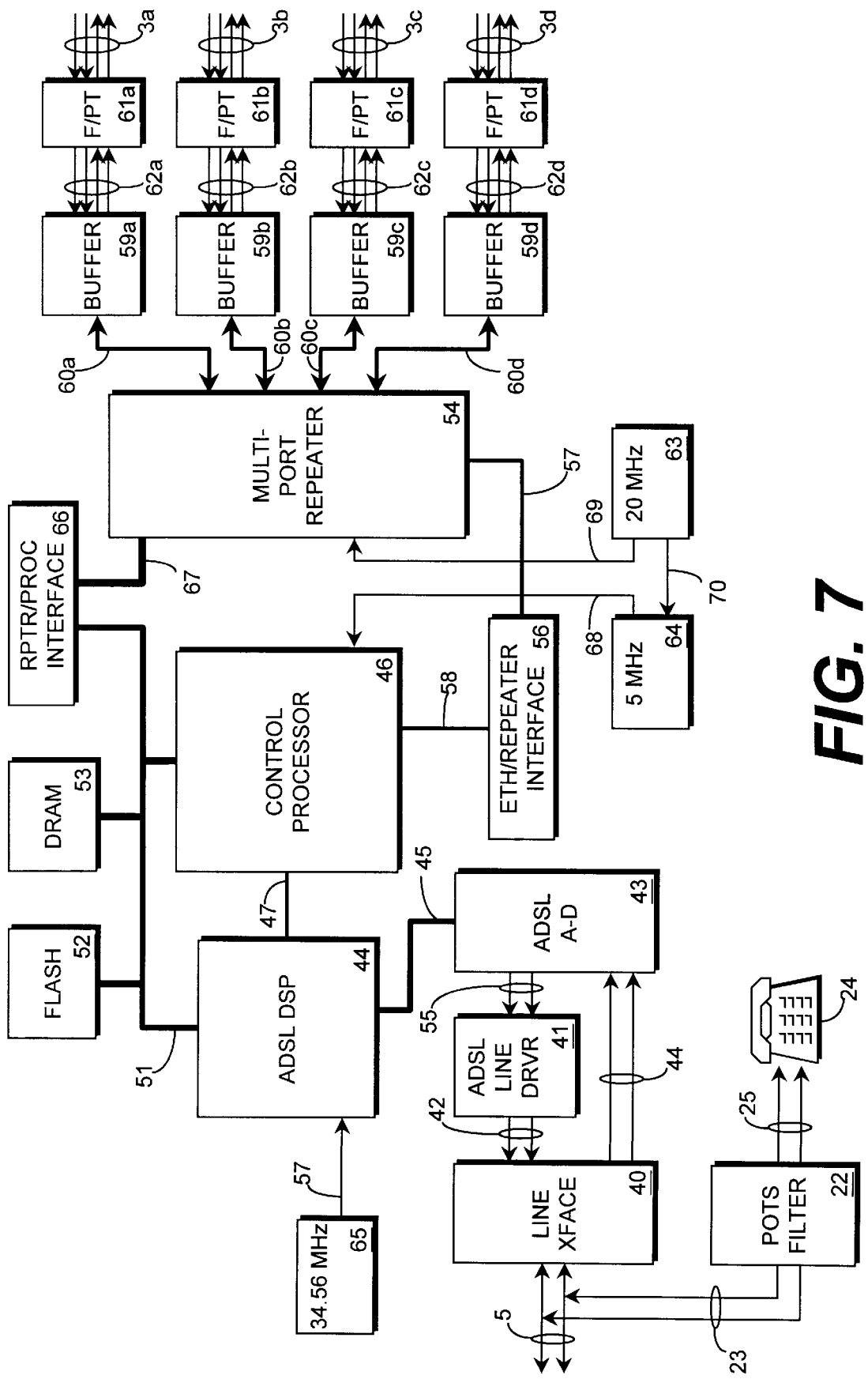
FIG. 7 shows a block diagram of a remote ADSL transceiver unit of the present invention.

FIG. 7 shows a block diagram of ATU-R 1 of the present invention. POTS filter 22 has input connections 23 connected to TWP 5, and has output connections 25 connected to telephone 24. Line interface unit 40 has inputs from central office 33 over connection TWP 5, and inputs from ADSL line driver 41 over connections 42. Line interface unit 40 has analog outputs to ADSL analog-digital converter 43 over connections 44. ADSL analog-digital converter 43 also has analog outputs to ADSL line driver 41 over connections 55. ADSL analog-digital converter 43 is further connected to ADSL digital signal processor (DSP) 44 over data and control bus 45. ADSL DSP 44 is further connected to control processor 46 over data connections 47. ADSL DSP 44 and control processor 46 are also connected over control bus 51. Also connected to bus 51 are flash memory 52 and DRAM memory 53. Control bus 51 carries data and address information as well as control signals. Multi-port repeater 54 is connected to bus 51 through repeater/processor interface 66 over bus 67. Multi-port repeater 54 is further connected to Ethernet network interface/repeater interface unit 56 over bus connection 57. Ethernet/repeater interface unit 56 is further connected to control processor 46 over bus connection 58. Buffers 59 are connected to multi-port repeater 54 over connections 60. Buffers 59 are connected to filter and pulse transformer units 61 over 4-lead connections 62. Filter and pulse transformer units 61 are connected over 4-lead connections 3 to computing devices 2.

20 MHz clock 63 provides a timing signal to multi-port repeater 54 over connection 69. 5 MHz clock 64 is derived from 20 MHz clock 63 over connection 70 and provides a timing signal to processor 46 over connection 68. 34.56 MHz clock 65 provides a timing signal to ADSL DSP 44 over connection 49.

In the preferred embodiment of the present invention, ATU-R 1 is implemented as the remote terminal end of an ADSL loop that provides a nominal downstream data rate of 1.6 Mbs and an upstream data rate of 72 Kbs, with an optional speed of 2.01 Mbs downstream and 130 Kbs upstream, using Carrierless Amplitude and Phase modulation (CAP) technology. The user interface consists of a 4-port 10BASE-T Ethernet hub.

Control processor 46 is preferably a Motorola model MC68EN360 microprocessor, which provides integrated peripheral support for Ethernet, HDLC and asynchronous serial devices, as well as interrupt controller, DMA and timer support Detailed information on the use and operation of this product is found in Motorola publication "MC68EN360 QUad Integrated Communications Controller User's Manual" and related publications.

The clock for processor 46 is derived from 20 MHz clock 63. 20 MHz clock 63 is divided to 5 MHz to provide a 50% duty cycle clock 64 to processor 46.

The MC68EN360 can provide up to eight chip selects. CS0 is the boot chip select and is used on reset. It is connected to flash memory 52 and configured for an 8-bit port, read-only, two wait states and 512 k bytes. The other configured chip selects are: CS1 connected to DRAM 53, configured for a 32-bit port, read/write, one wait state, DRAM, fast page mode and 1M bytes; CS3 connected to ADSL DSP 44, configured for an 8-bit port, read/write, one wait state and 16 bytes; and CS4 connected to multi-port repeater 54, configured for an 8-bit port, read/write, 3 wait states and 16 bytes. All chip selects are programmed for internal DSACK generation.

Serial communication controller (SCC) "1" of the MC68EN360 processor is used as the Ethernet network interface controller. This SCC is the only one that can be used as a 10 Mbps Ethernet network interface controller because this SCC is the only one that has receive and transmit FIFOs that are 32 bytes deep, and thus able to operate at the required high data rate. SCC1 preferably is programmed for the Ethernet mode of operation as specified in "MC68360 Users Manual", and have control and data signals Transmit Clock, Receive Clock, Transmit Data, Receive Data, Transmit Enable, Receive Enable and Collision. These signals are carried on connection 58.

SCC2 of the MC68EN360 processor is used in the HDLC mode to communicate over the ADSL link. Clocks for the transmitted and received data are provided by the ADSL chip set. No hardware handshake is provided. SCC2 preferably is programmed for the HDLC mode of operation as specified in "MC68360 Users Manual", and have control and data signals Transmit Clock, Receive Clock, Transmit Data and Receive Data. These signals are carried on connections 47.

Flash memory 52 is a 512K array provided for storage of firmware for MC68EN360 processor 46. The lower 64K contains a loader program to update the Flash image. Flash memory 52 is connected to chip select CS0 of MC68EN360 processor 46.

DRAM memory 53 is a 1M×32-bit array provided for execution of firmware and storage of data. DRAM chip select CS1 is programmed for one wait state, which allows for the use of standard 60 ns devices. DRAM 53 requires a refresh period of 15.625 us. Bits RCNT7-0 of the Global Memory Register of MC68EN360 processor 46 are set to 0×17 to provide a refresh period of 14.95 us.

Multi-port repeater 54 is preferably a National Semiconductor model DP83955A Lite Repeater Interface Controller, also known by the trademark LERIC, that is used to provide a 4-port 10BASE-T hub on ATU-R 1 to which computing devices 2 connect over connections 3. The LERIC fully implements the IEEE 802.3 repeater specification. Detailed information on the specifications, use and operation of the LERIC are contained in the LERIC data sheet and application notes.

The LERIC provides six ports that have integrated 10BASE-T transceivers, of which four are used in this embodiment. Ethernet/repeater interface 56 uses the inter-LERIC expansion bus 57 to generate Ethernet drive signals over connection 58 for the embedded Ethernet network interface controller of MC68EN360 processor 46.

Buffers 59 serve as driver chips to allow a segment length of 100 meters. These buffers are preferably model 74HC244. Filter and pulse transformer units 61 may be any of the commonly available 10BASE-T pulse transformers The ADSL functions of ATU-R 1 of the preferred embodiment are provided under license by a GlobeSpan Technologies, Inc. (GlobeSpan) Phase 3 CAP ADSL chip set. This chip set is described in GlobeSpan publication "Phase 3 T1/E1 ADSL Transceiver Product Design Guide, Rev 5.0", 1996.

ADSL DSP 44 is preferably a GlobeSpan model 1051DL2 STARLET DSL Digital Signal Processor. The STARLET performs the digital subscriber line (DSL) signal processing functions of ATU-R 1. The STARLET is also the interface between MC68EN360 processor 46 and the ADSL circuits through connections 47. Details of the timing of this interface are described in "AT&T ADSL Design Guide." Detailed information for this product is available in Globe- Span publication "1051DL2 STARLETT Data Sheet (Draft)", January 1997.

ADSL analog-digital converter 43 is preferably a GlobeSpan model T5257A SLADE analog-digital converter. This a–d converter does both analog-to-digital and digital-to-analog conversion, and is targeted specifically for digital subscriber line applications Detailed information for this product is available in GlobeSpan publication "T5257A SLADE Data Sheet (Draft)", January 1997.

ADSL line driver 41 is preferably an Elantec model EL1501CM SLIDE ADSL Line Driver. This device boosts the ADSL signals on connections 55 to sufficient strength to transmit on the network. Detailed information on this product is available in "Elantec 1995 New Products Data Book."

Line interface unit 40 comprises an isolation transformer with protection circuitry and band pass filters, and is matched to POTS filter 22. Line interface unit 40 also separates the receive and the transmit signal onto connections 48 and 42 using a standard implementation of a hybrid network 2-wire-to-4-wire interface.

Passive low-pass filter 22 is required to reduce voice band harmonic energy into the loop which would affect the ADSL circuits, and to reduce high power ADSL frequencies into the POTS circuitry. The actual circuit is supplied by and proprietary to GlobeSpan. However, the preferable performance parameters of low-pass filter 22 are: attenuation less than 0.25 dB up to 4000 Hz (voice band); longitudinal balance better than 60 dB from 200 Hz to 1000 Hz, and better than 56 dB at 3400 Hz; loop DC resistance less than 20 ohms; less than 2 dB reduction in 2WRL; less than 1 dB reduction in 4WRL; less than 100 us of group delay in the voice band; and less than 20 ms added delay to ring trip detection.

Figure 8:
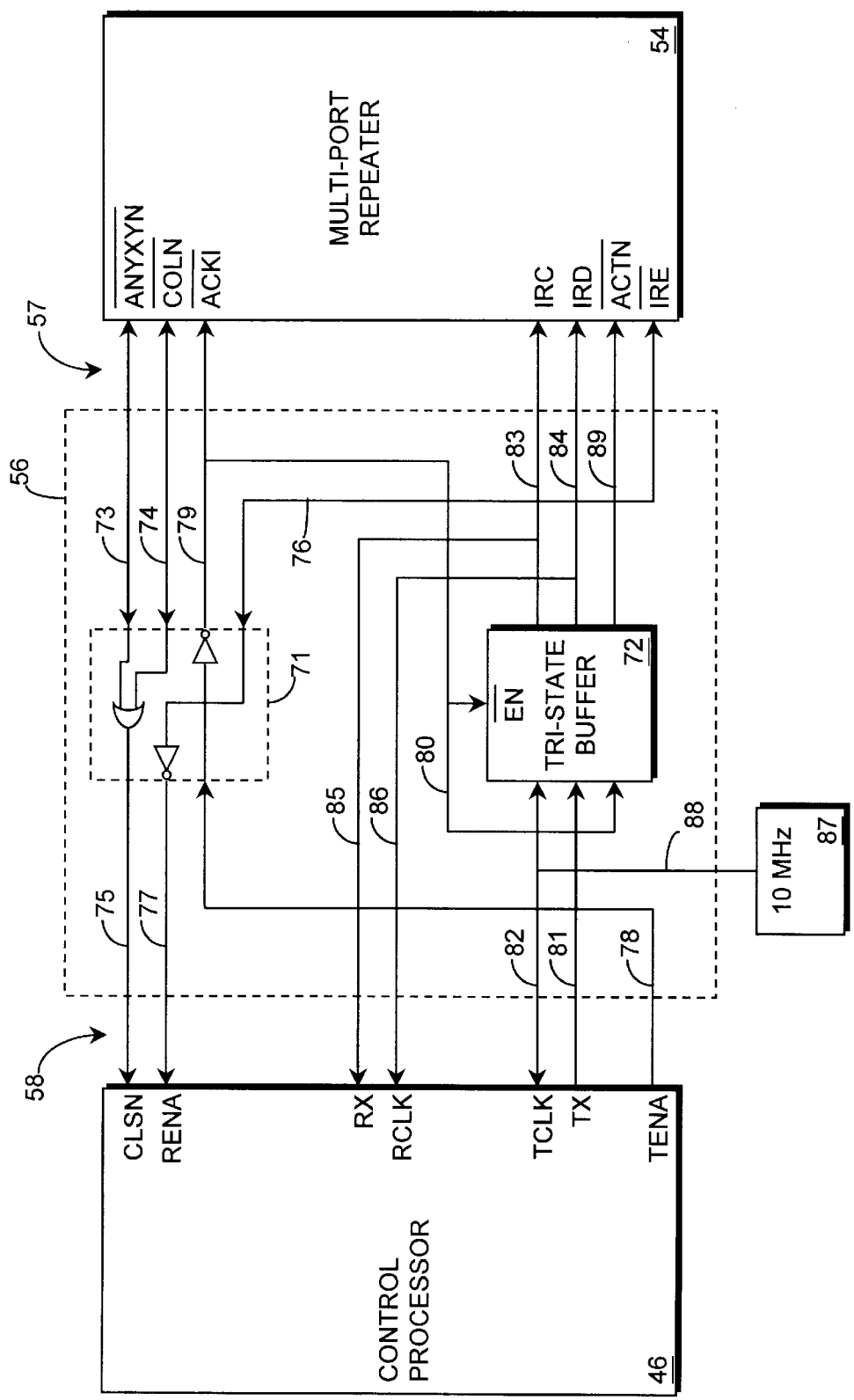
FIG. 8 shows a block diagram of a Ethernet network interface controller/repeater interface of the present invention.

FIG. 8 shows a block diagram of Ethernet network interface/repeater interface 56. This interface is described in National Semiconductor Corp. publication "DP83956EB-AT LERIC PC-AT Adapter," November 1992. Ethernet/repeater interface 56 comprises logic block 71 and tri-state buffer 72. Logic block 71 performs a logical OR of signals Activity on Any Port Excluding Port N ANYXYN__ and Collision on Port N COLN__ over connections 73 and 74, respectively, from repeater 54, and outputs signal Collision CLSN to processor 46 over connection 75. Logic block 71 also receives signal Inter-LERIC Enable IRE__ over connection 76 from repeater 54 and outputs an inverted version of same as signal Receive Enable RENA over connection 77 to processor 46, and receives signal Transmit Enable TENA over connection 78 from processor 46 and outputs an inverted version of same as signal Acknowledge Input ACKI__ over connection 79 to repeater 54. The inverted TENA signal on connection 80 is also used to drive tri-state buffer 72 that gates signals Transmit Data TX on connection 81 and Transmit Clock TCLK on connection 82, both from processor 46, to signals Inter-LERIC Clock IRC on connection 83 and Inter-LERIC Data IRD on connection 84, respectively, both to repeater 54. Signals Receive Data RX on connection 85 and Receive Clock RCLK on connection 86, both from processor 46, are applied directly to signals IRC on connection 83 and IRD on connection 84, both to repeater 54. Signal ACKI__ on connection 80 drives enable signal EN__ of buffer 72, and also drives signal Activity on Port N ACTN__ on connection 89. 10 Mhz clock 87 drives signal Transmit Clock TCLK of processor 46 over connection 88.

LERIC 54 treats the Ethernet network interface controller of processor 46 as another LERIC when it is connected to inter-LERIC bus 57. Use of the inter-LERIC bus also eliminates the need for an encoder/decoder to which the network interface controller is usually connected. Since the inter-LERIC bus is bidirectional, tri-state buffer 72 is used to control the direction of signals. Processor 46 signal Transmit Enable TENA on connection 78 causes buffer enable signal EN__ on connection 80 to be asserted, allowing processor signals Transmit Data TX and Transmit Clock TCLK on connections 81 and 82 to pass through buffer 72 to LERIC signals inter-LERIC Clock IRC and inter-LERIC Data IRD over connections 83 and 84.

Figure 9:
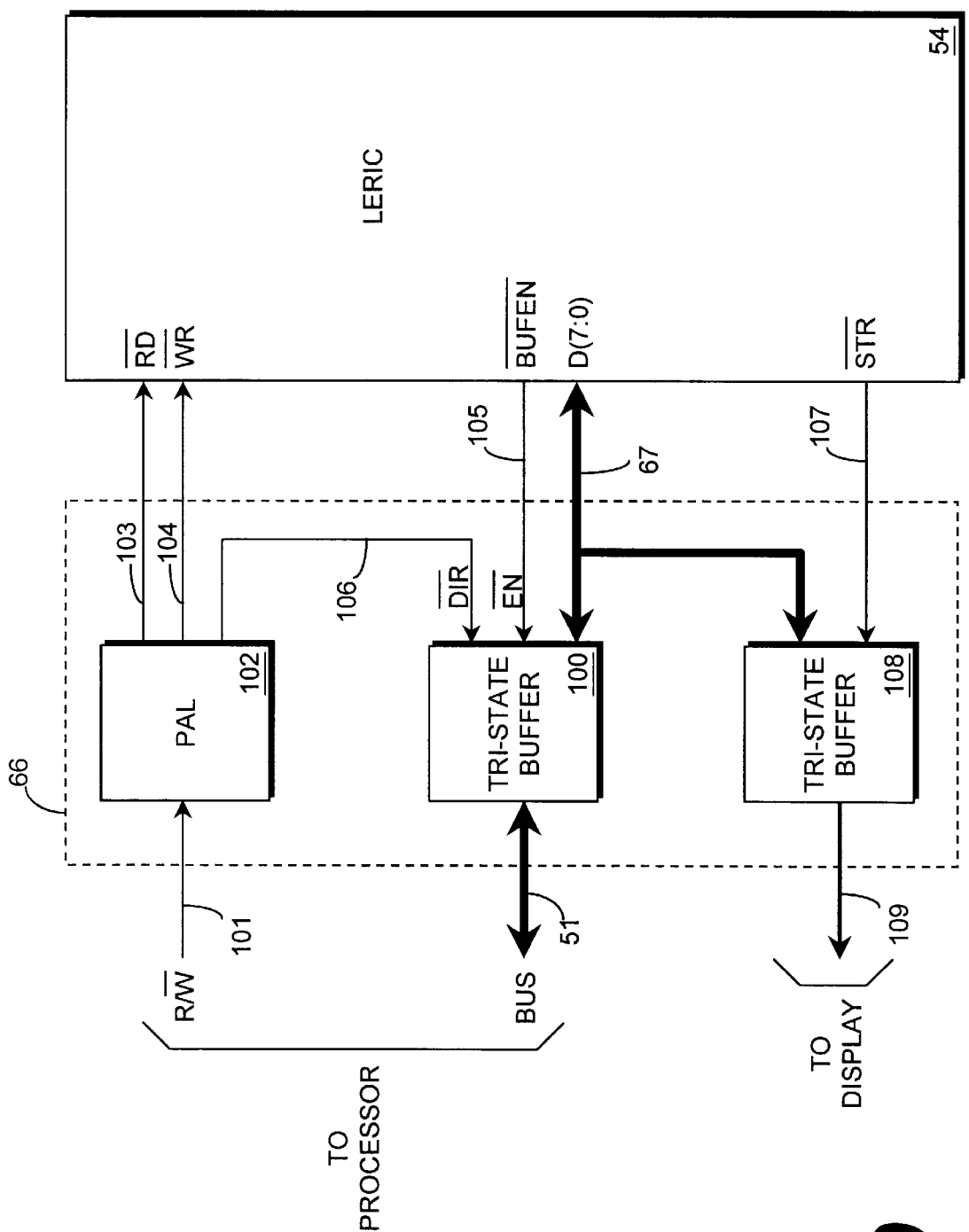
FIG. 9 shows a multi-port repeater/processor interface of the present invention.

FIG. 9 shows a block diagram of repeater/processor interface 66. This interface is described in National Semiconductor Corp. publication "DP83955A/DP83956A LitE Repeater Interface Controller," July 1993. Access to LERIC 54 registers is made via control bus 67. This bus is also used to provide data and address information to off-chip LED display latches during display update cycles. Consequently, tri-state buffer 100 is placed between LERIC 54 and control bus 51. To access LERIC 54 registers, read/write signal R/W__ from processor 46 is asserted on connection 101 to PAL 102 causing either signal RD__ on connection 103 or signal WR__ on connection 104 to be asserted. LERIC 54 responds by completing any display updates in process and asserting buffer enable signal BUFEN__ on connection 105 to buffer 100. Data direction signal DIR__ on connection 106 from PAL 102 to buffer 100 controls the direction of data through buffer 100. Latch enable signal STR__ on connection 107 to buffer 108 allows data and address signals asserted on control bus 67 during a LERIC 54 display update cycle to be latched into buffer 108 and be passed to, for example, LED display circuits over connection 109.

In operation, ATU-R 1 can be viewed as supporting two main functions. The first main function is that of an ADSL data pump. This function comprises components ADSL digital signal processor 44, ADSL analog-digital converter 43 and ADSL line driver 41. The second main function is packet processing of Ethernet information. In the preferred embodiment, the Ethernet protocol is layered on top of HDLC packets. This function comprises the HDLC interface of processor 46, the Ethernet interface of processor 46, multi-port repeater 54, the subscriber computing devices 2, and the various enabling interface circuits along this path.

Illustrative of the ADSL data pump function, an analog signal containing POTS and ADSL components is received on connection 5 from ATU-C 4. POTS filter 22 receives this analog signal and passes voice-band signals to telephone 24 over connection 25. Line interface 40 also receives the analog signal, passes the ADSL-band signals and separates the receive and transmit signals onto four wires. ADSL analog-digital converter 43 receives the ADSL analog signal and converts the analog signal to a digitized signal. ADSL digital signal processor 44 receives the digitized signal, converts it to a serial digital data stream and outputs the data stream over data connections 47 to the HDLC controller interface of control processor 46.

For signals originating with computing devices 2, HDLC packets are applied to ADSL digital signal processor 44 over connections 47. These packets are converted to a digitized ADSL signal and transmitted to ADSL analog-digital converter 43. ADSL analog-digital converter 43 converts the digitized ADSL signal to an analog one, send the analog signal to ADSL line driver 41 where it is transmitted to line interface 40 and out onto the twisted pair to ATU-C 4.

Illustrative of the packet processing and Ethernet function of ATU-R 1, the data flow for this function is as follows.

HDLC packets are received by the HDLC controller interface of control processor 46 and are made available to the Ethernet interface of control processor 46 where they are assembled into Ethernet packets. These Ethernet packets are passed to multi-port repeater 54 through Ethernet/repeater interface 56. Multi-port repeater 54 then broadcasts the Ethernet packet to all computing devices 2 over connections 3. Ethernet data originating from computing devices 2 follows this same path in reverse. Ethernet data from a computing device 2 that is received by multi-port repeater 54 is broadcast to all other computing devices 2.

In the preferred embodiment, reception of an Ethernet packet from a computing device 2 by processor 46 causes an interrupt in processor 46. Processor 46 then compares the destination address in the packet against a list of learned computing device 2 addresses and does not pass packets that are addressed from one computing device 2 to another. These packets are sent to their destinations via the hub function of multi-port repeater 54. Packets from a computing device 2 with a broadcast destination are also discarded, with two exceptions: address resolution messages and DHCP messages. These are transmitted to ATU-C 4 for processing. Packets with destination addresses other than those found in the remote address table are forwarded to ATU-C 4 for processing.

Ethernet and HDLC packets accepted by processor 46 are handled under program control in the manner shown in FIGS. 2–6.

In the preferred embodiment, ATU-R 1 is kept deliberately simple to avoid the expense of an operating system and network stack. These modules are concerned primarily with data transport. An internal protocol is used to communicate control information between ATU-R 1 and ATU-C 4. This channel shares the HDLC link using reserved MAC source and destination addresses.

Figure 10:
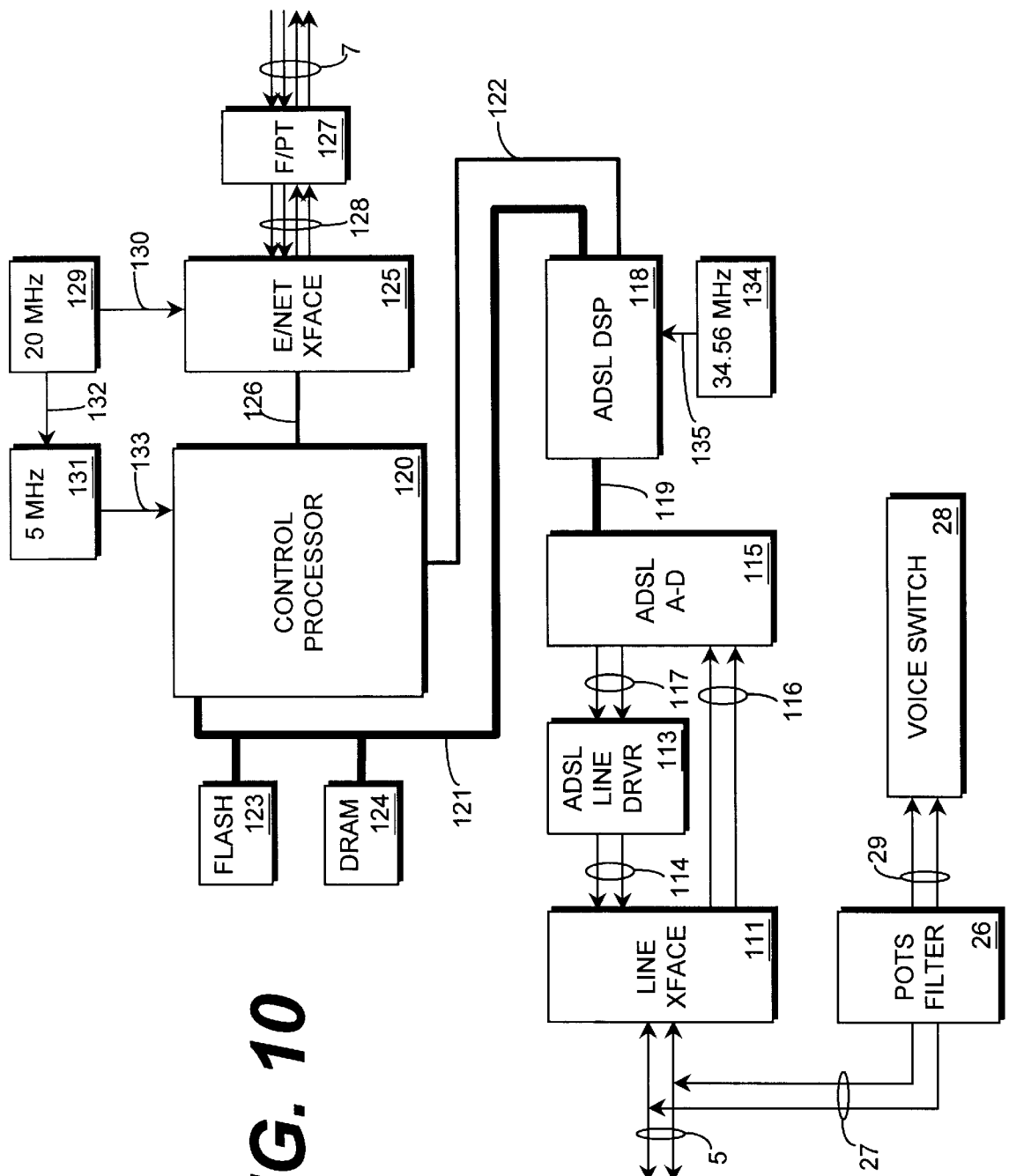
FIG. 10 shows a block diagram of a central ADSL transceiver unit of the present invention.

FIG. 10 shows a block diagram of ATU-C 4 of the present invention. POTS filter 26 is connected to TWP 5 over connections 27, and to voice switch 28 over connection 29. Line interface unit 111 is connected to TWP 5 and has analog outputs to ADSL analog-digital converter 115 over connections 116. ADSL analog-digital converter 115 also has analog outputs to ADSL line driver 113 over connections 117. ADSL line driver also has outputs to line interface unit 111 over connections 114. ADSL analog-digital converter 115 is further connected to ADSL DSP 118 over data and control bus 119. ADSL DSP 118 is further connected to control processor 120 over control bus 122. ADSL DSP 118 and control processor 120 are also connected over data bus 121. Also connected to data bus 121 are flash memory 123 and DRAM memory 124. Control processor 120 is further connected to Ethernet interface 125 over connection 126. Ethernet interface 125 is further connected to filter and pulse transformer 127 over connections 128. Filter and pulse transformer 127 is connected to 10BASE-T concentrator 6 over connections 7.

20 MHz clock 129 provides a timing signal to Ethernet interface 125. 5 MHz clock 131 is derived from 20 MHz clock 129 over connection 132 and provides a timing signal to processor 133. 34.56 MHz clock 134 provides a timing signal to ADSL DSP 118.

In the preferred embodiment of the present invention, ATU-C 4 is implemented as the central office end of an ADSL loop that provides a nominal downstream data rate of 1.6 Mbs and an upstream data rate of 72 Kbs, with an optional speed of 2.01 Mbs downstream and 130 Kbs upstream, using CAP technology.

Control processor 120 is preferably a Motorola model MC68EN360 microprocessor, which provides integrated peripheral support for Ethernet, HDLC and asynchronous serial devices, as well as interrupt controller, DMA and timer support. The pSOS multitasking operating system with the pNA option is used on processor 120 to support concurrent operations and a TCP/IP stack. Detailed information on the use and operation of this product is found in Motorola publication "MC68EN360 QUad Integrated Communications Controller User's Manual" and related publications.

The clock for the MC68EN360 processor is derived from 20 MHz clock 129. 20 MHz clock 129 is divided to 5 MHz to provide a 50% duty cycle clock 131 to processor 120.

The MC68EN360 can provide up to eight chip selects. CS0 is the boot chip select and is used on reset. It is connected to flash memory 123 and configured for an 8-bit port, read-only, two wait states and 512 k bytes. The other configured chip selects are: CS1 connected to DRAM 124, configured for a 32-bit port, read/write, one wait state, DRAM, fast page mode and 1M bytes; and CS3 connected to ADSL DSP 118, configured for an 8-bit port, read/write, one wait state and 16 bytes.

SCC1 of the MC68EN360 is used as the Ethernet controller. This SCC is the only one that can be used as a 10 Mbps Ethernet controller because this SCC is the only one that has receive and transmit FIFOs that are 32 bytes deep, and thus able to operate at the required high data rate. SCC1 preferably is programmed for the Ethernet mode of operation as specified in "MC68360 Users Manual", and have control and data signals Transmit Clock, Receive Clock, Transmit Data, Receive Data, Transmit Enable, Receive Enable and Collision. These signals are carried on connection 126.

SCC2 of the MC68EN360 is used in the HDLC mode to communicate over the ADSL link. Clocks for the transmitted and received data are provided by the ADSL chip set. No hardware handshake is provided. SCC2 preferably is programmed for the HDLC mode of operation as specified in "MC68360 Users Manual", and have control and data signals Transmit Clock, Receive Clock, Transmit Data and Receive Data. These signals are carried on connection 122.

Flash memory 123 is a 512K array provided for storage of firmware for MC68EN360 processor 120. The lower 64K contains a loader program to update the Flash image. Flash memory 52 is connected to chip select CS0 of the MC68EN360 processor DRAM memory 124 is a 1M array provided for execution of firmware and storage of data. DRAM chip select CS1 is preferably programmed for one wait state, which allows for the use of standard 60 ns devices. DRAM 124 requires a refresh period of 15.625 us. Bits RCNT7-0 of the Global Memory Register of the MC68EN360 processor are set to 0x17 to provide a refresh period of 14.95 us.

Ethernet interface 125 is preferably a Motorola model MC68160FB Enhanced Ethernet Interface Transceiver. The MC68160FB provides the 10BASE-T twisted pair interface to the network. It provides a glueless interface to the Ethernet controller of MC68EN360 processor 120. Detailed information for the MC68160FB is available in Motorola document MC68160/D, "Enhanced Ethernet Transceiver," 1995.

Filter and pulse transformer 127 is matched to MC68160FB Ethernet interface 125. A list of suitable filter and pulse transformers is contained in "Enhanced Ethernet Transceiver."

The ADSL functions of ATU-C 4 of the preferred embodiment are provided under license by a GlobeSpan Technologies, Inc. (GlobeSpan) Phase 3 CAP ADSL chip set. This chip set is described in GlobeSpan publication "Phase 3 T1/E1 ADSL Transceiver Product Design Guide, Rev 5.0", 1996.

ADSL DSP 118 is preferably a GlobeSpan model 1051DL2 STARLET DSL Digital Signal Processor. The STARLET performs the digital subscriber line (DSL) signal processing functions of ATU-C 4. The STARLET is also the interface between MC68EN360 processor 120 and the ADSL circuits through bus 121. Details of the timing of this interface are described in "AT&T ADSL Design Guide." Detailed information for this product is available in Globe-Span publication "1051DL2 STARLETT Data Sheet (Draft)", January 1997.

ADSL analog-digital converter 115 is preferably a Globe-Span model T5257A SLADE analog-digital converter. This a–d converter does both analog-to-digital and digital-to-analog conversion, and is targeted specifically for digital subscriber line applications. Detailed information for this product is available in GlobeSpan publication "T5257A SLADE Data Sheet (Draft)", January 1997.

ADSL line driver 113 is preferably an Elantec model EL1501CM SLIDE ADSL Line Driver. This device boosts the ADSL signals on connections 117 to sufficient strength to broadcast on the network. Detailed information on this product is available in "Elantec 1995 New Products Data Book."

Line interface unit 111 comprises an isolation transformer with protection circuitry and band pass filters, and is matched to POTS filter 26. Line interface unit 111 also separates the receive and the transmit signal onto connections 116 and 114 using a standard implementation of a hybrid network 2-wire-to-4-wire interface.

Passive low-pass filter 26 is required to reduce voice band harmonic energy into the loop which would affect the ADSL circuits, and to reduce high power ADSL frequencies into the POTS circuitry. The actual circuit is supplied by and proprietary to GlobeSpan. However, the preferable performance parameters of low-pass filter 26 are: attenuation less than 0.25 dB up to 4000 Hz (voice band); longitudinal balance better than 60 dB from 200 Hz to 1000 Hz, and better than 56 dB at 3400 Hz; loop DC resistance less than 20 ohms; less than 2 dB reduction in 2WRL; less than 1 dB reduction in 4WRL; less than 100 us of group delay in the voice band; and less than 20 ms added delay to ring trip detection.

In operation, ATU-C 4 can be viewed as supporting an ADSL data pump function and an HDLC and Ethernet packet processing function in much the same manner as ATU-R 1. The ADSL data pump function is virtually the same in both ATU-C 4 and ATU-R 1. In the packet processing and Ethernet function of ATU-C 4, Ethernet packets generated by the Ethernet interface of processor 120 are transmitted to 10BASE-T concentrator 6 for further transmission onto WAN 10. As in ATU-R 1, Ethernet and HDLC packets accepted by processor 120 are handled under program control in the manner shown in FIGS. 2–6.

ATU-C 4 captures pairs of source IP/MAC addresses that are in address resolution requests generated by computing device 2 activity and sent by ATU-R 1. This address data is used in an address cache that allows ATU-C 4 to act as an ARP proxy server to requests coming from WAN 10. ARP requests to addresses that are not in the address cache are ignored, while requests with addresses in the cache are passed to ATU-R 1.

While the inventive system has been particularly shown and described, it is not intended to be exhaustive nor to limit the invention to the embodiment disclosed. It will be apparent to those skilled in the art that modifications can be made to the present invention without departing from the scope and spirit thereof. It is intended that the scope of the invention be defined by the claims appended hereto and their equivalents.

What is claimed is:

1. A secure transmission system for use in a wide area network (WAN) handling message traffic in accordance with a set of messaging protocols that use a network addressing scheme comprising source and destination addresses, the set of messaging protocols supporting broadcast and unicast addressing, and one or more service providers coupled to the WAN, each of said service providers having a network address, said secure transmission system comprising:

a transceiver coupled to said WAN;

one or more computing devices connected to said transceiver, each of said computing devices operated to transmit and receive message traffic in accordance with said messaging protocols, each of said computing devices having a network address;

means for associating each of said computing device network addresses with one of said service provider network addresses, said associating means having stored associations between said computing device network addresses and said service provider network addresses; and said transceiver being operated in response to a received unicast message to determine whether or not said association means has a stored association having the source network address and the destination network address of said unicast message, and to transmit said unicast message if said association means has a stored association having said source network address and said destination network address.

2. A secure transmission system according to claim 1, further comprising:

an authorization server coupled to said WAN;

said transceiver being responsive to a broadcast address resolution message received from one of said computing devices, to transmit said address resolution message to said authorization server as a unicast message;

said authorization server being responsive to said address resolution message to transmit a service provider selection screen to said computing device; and said authorization server being responsive to a completed service provider selection screen received from said computing device to enter an association between said computing device network address and said selected service provider network address into said association means.

3. A secure transmission system according to claim 1, wherein said transceiver further comprises:

a central transceiver unit coupled to said WAN; and a remote transceiver unit coupled to said central transceiver unit and having said computing devices connected thereto.

4. A secure transmission system according to claim 3, wherein said central transceiver unit further comprises:

a first communications interface operated to receive messages from and transmit messages onto said WAN;

a second communications interface operated to receive messages from and transmit messages to said remote transceiver; and a control processor coupled between said first and second communications interfaces.

5. A secure transmission system according to claim 4, wherein said first communications interface further comprises:
   an Ethernet interface coupled to said control processor; and
   a filter and pulse transformer coupled between said Ethernet interface and said WAN.

6. A secure transmission system according to claim 5, wherein said Ethernet interface further comprises a 10BASE-T Ethernet interface.

7. A secure transmission system according to claim 4, wherein said second communications interface further comprises:
   an ADSL interface coupled to said control processor; and
   a line interface unit coupled between said ADSL interface and said remote receiver.

8. A secure transmission system according to claim 4, wherein said control processor further comprises:
   an Ethernet controller coupled to said first communications interface; and
   a HDLC controller coupled to said second communications interface.

9. A secure transmission system according to claim 3, wherein said remote transceiver unit further comprises:
   a first communications interface operated to receive messages from and transmit messages to said computing devices;
   a second communications interface operated to receive messages from and transmit messages to said central transceiver; and
   a control processor coupled between said first and second communications interfaces.

10. A secure transmission system according to claim 9, wherein said first communications interface further comprises:
    an Ethernet interface coupled to said control processor; and
    a plurality of filter and pulse transformers coupled to said Ethernet interface, each of said filter and pulse transformers further coupled to one of said computing devices.

11. A secure transmission system according to claim 10, wherein said Ethernet interface further comprises an Ethernet hub having a plurality of ports, each of said ports coupled to one of said filter and pulse transformers.

12. A secure transmission system according to claim 11, wherein said Ethernet interface further comprises a 10BASE-T Ethernet hub.

13. A secure transmission system according to claim 9, wherein said second communications interface further comprises:
    an ADSL interface coupled to said control processor; and
    a line interface unit coupled between said ADSL interface and said central transceiver.

14. A secure transmission system according to claim 9, wherein said control processor further comprises:
    an Ethernet controller coupled to said first communications interface; and
    a HDLC controller coupled to said second communications interface.

\* \* \* \* \*

UNITED STATES PATENT AND TRADEMARK OFFICE
CERTIFICATE OF CORRECTION

PATENT NO : 5,978,373
DATED : November 2, 1999
INVENTOR(S): Hoff, et al

It is certified that error appears in the above-identified patent and that said Letters Patent is hereby corrected as shown below:

Column 1, line 3, after "TRANSMISSION", insert the paragraph

--This application is a continuation-in-part of application Ser. No. 08/810,437, filed March 4, 1997, now abandoned.--

Signed and Sealed this

First Day of August, 2000

Attest:

Q. TODD DICKINSON

*Attesting Officer*  *Director of Patents and Trademarks*